United States Patent
Uemura et al.

(10) Patent No.: US 6,434,288 B1
(45) Date of Patent: Aug. 13, 2002

(54) OPTICAL SWITCHING SYSTEM

(75) Inventors: Aritomo Uemura; Hiroshi Ichibangase; Takashi Mizuochi; Tadayoshi Kitayama; Shu Yamamoto; Tetsuya Miyazaki; Takatomi Kabashima; Naoki Kobayashi, all of Tokyo (JP)

(73) Assignees: KDD Corporation; Mitsubishi Denki Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/530,448

(22) PCT Filed: Aug. 30, 1999

(86) PCT No.: PCT/JP99/04682
§ 371 (c)(1),
(2), (4) Date: Jun. 13, 2000

(87) PCT Pub. No.: WO00/13347
PCT Pub. Date: Mar. 9, 2000

(30) Foreign Application Priority Data

Aug. 31, 1998 (JP) .......................................... 10-245795

(51) Int. Cl.[7] .................................................. G02B 6/26
(52) U.S. Cl. ........................... 385/16; 359/128; 370/216
(58) Field of Search ............................. 385/16, 17, 20, 385/22; 370/216, 217, 222, 223; 359/128

(56) References Cited

U.S. PATENT DOCUMENTS 5,442,623 A * 8/1995 Wu ........................... 370/16.1
5,986,783 A * 11/1999 Sharma et al. ............... 359/119
6,088,141 A * 7/2000 Merli et al. .................. 359/110

FOREIGN PATENT DOCUMENTS

| JP | A8-149088  | * | 6/1996  |
| JP | A8-293854  | * | 11/1996 |
| JP | A11-127183 | * | 5/1999  |
| JP | A11-289296 | * | 10/1999 |
| JP | A10-112700 | * | 4/2000  |

OTHER PUBLICATIONS

K. Asahi et al., Proceedings of the 1977 IEICE General Conference, B–10–230, p. 739.*
Katsuhiro Shimano et al., Proceedings of the 1997 Society Conference of the Institute of Electronics, Information and Communication Engineers of Japan, B–10–85, p. 384.*

* cited by examiner

Primary Examiner—Ellen E. Kim

(57) ABSTRACT

An optical switching system is implemented by providing a transmitting section with a preparatory transmitted optical signal selector and a working transmitted optical signal splitter, which are each implemented by a 1×2 optical space switch, and by providing a receiving section with a receiving optical switch which is implemented by a 2×2 optical space switch, and with a preparatory receiving optical gate which is implemented by a 1×2 optical space switch. This makes it possible to switch between the working system and preparatory system without employing any 4×4 optical space switch, thereby implementing a practical optical switching system without causing such problems as communication interruption during maintenance or impairment of transmission path working efficiency.

7 Claims, 12 Drawing Sheets

FIG.8
(1)
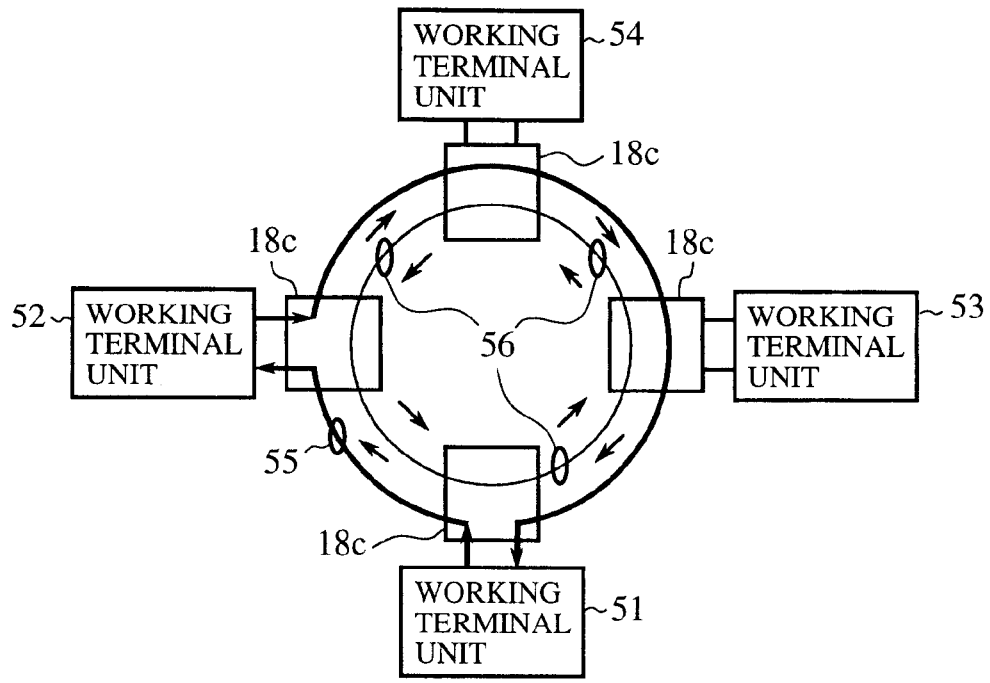
(2)
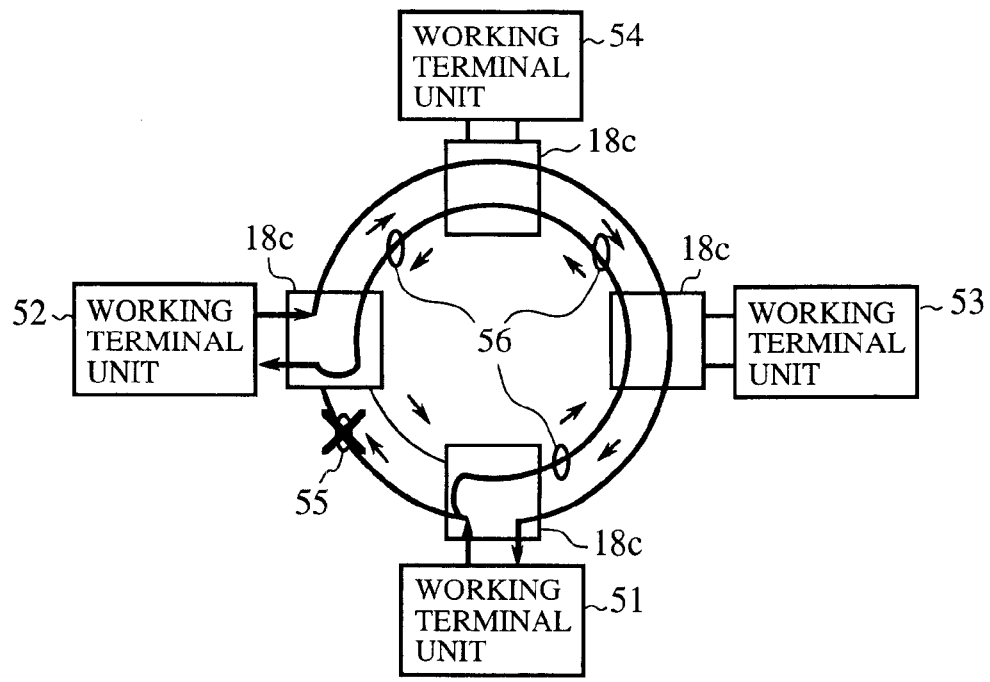

US 6,434,288 B1

OPTICAL SWITCHING SYSTEM

This application is the national phase under 35 U.S.C. § 371 of PCT International Application No. PCT/JP99/04682 which has an International filing date of Aug. 30, 1999, which designated the United States of America.

1. Technical Field

The present invention relates to an optical switching system for carrying out path switching on a network that interconnects a plurality of nodes through a working path and a preparatory path using optical signals.

2. Background of the Invention

FIG. 1 is a block diagram showing a partially redrawn conventionally studied optical switching system as disclosed under the title of "WDM four fiber ring experiment", B-10-230, page 739, Proceedings of the 1997 IEICE (the Institute of Electronics, Information and Communication Engineers of Japan) General Conference; and FIG. 2 is a partially redrawn operational diagram illustrating a path switching operation in case of a fault described in this paper.

In FIG. 1, a reference numeral 101 designates an acoustooptic filter for isolating any desired wavelength component; 102 designates a 4×4 optical space switch for connecting four optical inputs to four output ports in any desired pattern; 103 designates a recombining element for recombining optical signals; 104 designates an optical amplifier for collectively amplifying wavelength multiplexed optical signals; 105 designates a terminal unit for transmitting and receiving optical signals; 106 designates an east side (denoted as "East side" from now on) working input/output port (denoted as "WRK in/out port" from now on) for interconnecting a working path between nodes; 107 designates a west side (denoted as "West side" from now on) WRK in/out port for interconnecting the working path between nodes; 108 designates an East side preparatory input/output port (denoted as "PRT in/out port" from now on) for interconnecting a preparatory path between the nodes; and 109 designates a west side PRT in/out port for interconnecting the preparatory path between the nodes.

In FIG. 2, reference numerals 111–114 each designate a node corresponding to the optical switching system as shown in FIG. 1; 115 designates an inside transmission path for transmitting optical signals in both directions used as the working path for interconnecting the nodes. The reference numeral 116 designates an outside path for transmitting optical signals in both directions used as the preparatory path for interconnecting the nodes. Reference numerals 117 each designate a 4×4 optical space switch in the node; 118 each designate a working terminal unit connected to the node; and 119 each designate a preparatory terminal unit.

Next, the operation will be described.

In FIG. 2, the transmission paths 115 and 116 that interconnect the nodes 111–114 are wavelength multiplexed, and are connected to the WRK in/out ports 106 and 107 and PRT in/out ports 108 and 109 of the optical switching system of FIG. 1. Each acoustooptic filter 101, receiving a drive signal, isolates a particular wavelength signal to be connected to the optical space switch 102, and passes the remaining wavelength signals without change. Without the drive signal, all the wavelength optical signals pass through the acoustooptic filters 101. Thus, each acoustooptic filter 101 is used as a switch for switching whether to remove (denoted as "Drop" from now on) the wavelength from the transmission path or not by the drive signal.

The isolated signals output from the acoustooptic filters 101 are connected to appropriate terminal units 105 via the optical space switches 102 to be received. The individual nodes are each connected to four terminal units 105, so that they are connected to East side and West side WRK in/out ports and PRT in/out ports.

The optical signals input to the optical switching system through the terminal units 105 are distributed to the appropriate recombining elements 103 at the output ports by the optical space switches 102, recombined with the optical signals of other wavelengths passing through the acoustooptic filters 101, and transmitted to adjacent nodes through the output ports as wavelength multiplex signals.

The optical space switches 102 switch, if some fault takes place on the transmission path, the communications on the working system to the recombining elements 103 on the same or reverse direction preparatory path in accordance with the fault pattern, thereby saving the communications on the working system at the cost of the communications on the preparatory system.

Thus, the network is constructed by providing the nodes of the transmission paths with the optical switching system with the foregoing functions and by connecting the transmission paths in a ring-like pattern.

Next, an example of the switching operation in case of a network fault will be described with reference to FIG. 2.

In a normal operation mode in which no fault takes place, communications can be carried out using the working path and preparatory path as shown in FIG. 2(1). For example, the working terminal units 118 connected to the node 111 and to the node 113 are bidirectionally interconnected through the working path 115, and the terminal units 119 connected to the node 113 and to the node 114 are bidirectionally interconnected through the preparatory paths 116.

If a fault takes place on the working path 115 interconnecting the nodes 111 and 113, and the preparatory path passing through the same route is in a faultless state, the optical space. switches 117 of the nodes 111 and 113 that carry out transmission and reception are switched to the preparatory paths of the same direction as shown in FIG. 2(2), so that the communication path used by the working terminal unit 118 is switched to the preparatory path passing through the same route, thereby detouring the signal flowing through the transmission path 115 to the transmission path 116, and preventing the transmission path from being disconnected.

If a fault takes place simultaneously on both transmission paths 115 and 116 interconnecting the nodes, the optical space switches 117 of the nodes 111 and 113 switch the input/output ports for transmission and reception to the opposite preparatory path side as shown in FIG. 2(3), thereby detouring the signals to the transmission path 116 passing through the network in the opposite direction, and preventing the working path from being disconnected. In this case, the communications carried out between the nodes 113 and 114 using the transmission path 116 in the faultless state are disconnected to prevent the disconnection of the working transmission path.

FIG. 3 is a block diagram showing another partially redrawn conventionally studied optical switching system as disclosed under the title of "Node configuration on OADM ring system", B-10-85, page 384, Proceedings of the 1997 Society Conference of the Institute of Electronics, Information and Communication Engineers of Japan.

In FIG. 3, reference numerals 121 each designate an optical switching system that receives currently working signals, and switches, in case of a transmission path fault, an optical signal path to an unimpaired transmission path; the reference numeral 122 designates a backup optical switching system used in place of one of the optical switching systems 121 when it is faulty; λ(1)-λ(n+1) each designate an optical signal with a different wavelength; reference numerals 127–128 each designate a terminal unit connected to the optical switching system 121 and 122 for transmitting and receiving the optical signals λ(1)-λ(n+1); 123 and 124 each designate a wavelength multiplexer for wavelength multiplexing the optical signals λ(1)-λ(n+1) with different wavelengths transmitted from the terminal units 127–128, and for sending them out to transmitting paths; 125 and 126 each designate a wavelength demultiplexer for demultiplexing the wavelength multiplex signals fed from receiving paths for respective wavelengths, and for inputting them to the optical switching systems corresponding to the optical signals λ(1)-λ(n+1) with different wavelengths; 131 designates intra-office interfaces for inputting signals to be transmitted to the transmission paths; 132 designates intra-office interfaces for outputting signals received from the transmission paths; and 129 and 130 each designate an (n+1):n electric switch for recovering, when a fault takes place in a certain unit associated with a particular wavelength among the terminal units 127–128 or optical switching systems 121 provided for each of the n wavelengths, the fault by switching the transmitted and received signals associated with the unit corresponding to that faulty wavelength to the backup unit corresponding to the (n+1) th wavelength.

The reference numeral 24 designates a transmitting section installed in each optical switching system 121; 23 designates a receiving section installed in each optical switching system 121; 11 designates a working transmitted optical signal splitter provided for each transmitting section 24; and 22 designates a working received optical signal selector provided for each receiving section 23.

Next, the operation will be described.

The conventional example assumes to be applied to a ring network employing the bidirectional transmission paths that enable individual communications for respective wavelengths based on the wavelength multiplexing technique. Communication paths for optical signals of respective wavelengths comprise terminal units 127–128 and optical switching systems 121 and 122, and are connected to the transmission paths through the wavelength multiplexers 123 and 124 and the wavelength demultiplexers 125 and 126. The n intra-office interfaces 131 or 132 for outputting or inputting the optical signals to be transmitted or received correspond to n+1 wavelengths prepared in advance, and the n working channels have one preparatory channel, constituting a 1:n configuration.

If a fault takes place in a terminal unit or in an optical switching system associated with a particular wavelength, the intra-office interface associated with the fault is connected to the preparatory channel through the (n+1):n electric switch 129 or 130, thereby recovering the fault of the system.

If a fault takes place in a transmission path, the fault is recovered by the switching operation of the optical switching systems 121 and 122. The transmitting section of each of the optical switching systems 121 and 122 associated with respective wavelengths divides the transmitted signal into two with the working transmitted optical signal splitter 11, and sends them to the two transmitting paths. On the other hand, in each receiving section, the working received optical signal selector 22 selects one of the optical signals fed from the two receiving paths. If a fault takes place on one of the two receiving paths, the working received optical signal selector 22 selects the remaining faultless receiving path to recover the fault of the transmission path.

The conventional optical switching systems have the foregoing configurations. The first conventional example as shown in FIGS. 1 and 2 disclosed in the B-10-230 paper employs, when the network is normal, both the working path and preparatory path separately for different communications, whereas in case of a fault it detours the currently working signals to the preparatory path using the 4×4 optical space switches 102 or 117 for the path switching. This presents a problem in that the 4×4 optical space switches 102 or 117 utilizing waveguides have not yet reached a level required for practical applications in the characteristics such as an extinction ratio or loss, or reliability and power consumption.

On the other hand, the 4×4 optical space switches 102 or 117 utilizing mechanical optical space switches can meet the foregoing characteristics with the reliability of practical level, and the mechanical switches with a latch function have an advantage of being able to eliminate the power required for holding the present state. These switches, however, have a problem of increasing packaging dimensions because the function of a unit switch is limited to 1×2 or 2×2, which means that 16 unit switches are required to implement the 4×4 optical space switch 102 or 117 by combining the 2×2 unit switches.

Furthermore, when a 4×4 optical space switch 102 or 117 in a certain node has to be replaced because of a fault, the conventional example has a problem of interrupting during the recovery job all the communications passing through the terminal units 105, 118 or 119 connected to the node because all the transmitted or received signals connected to the terminal units 105, 118 or 119 are connected to a single optical space switch 102 or 117.

The conventional example as shown in FIG. 3 disclosed in the, B-10-85 paper divides the output signals from the optical switching systems 121 and 122 to the two transmitting paths so that the two paths transmit the same signals. This presents a problem in that the working efficiency of the transmission paths is limited to ½ because the network always transmits the same signals through the two paths.

The present invention is implemented to solve the foregoing problems. Therefore, an object of the present invention is to provide an optical switching system with high transmission path working efficiency without interrupting all the communications during the recovery job such as component replacement in case of a fault of an optical space switch by decreasing the number of the optical space switches, thereby reducing the packaging size with maintaining the characteristics and reliability of the optical space switches.

SUMMARY OF THE INVENTION

The optical switching system according to the present invention comprises a receiving section including a receiving optical switch for receiving an optical signal input to a working input port and an optical signal input to a preparatory input port, for outputting as two output signals the two input signals by spatially switching their paths or by passing them through, and for connecting a first output of the two output signals to a working drop port, and a preparatory receiving optical gate for turning on or off a second output signal from the receiving optical switch to be supplied to a preparatory drop port.

According to the present invention, a transmitting section comprises a working transmitted optical signal splitter and a preparatory transmitted optical signal selector, and the receiving section comprises the receiving optical switch and the preparatory receiving optical gate. If a fault takes place in the working path while the preparatory path conveys a signal such as an extra traffic signal different from the signal on the working signal in a faultless state, the preparatory receiving optical gate breaks the optical signal to be supplied to the preparatory drop port, thereby preventing the working signal from being erroneously connected to the preparatory drop port when the switching operation is carried out in the fault. This offers an advantage of being able to make full use of the total transmission capacity of both the working path and preparatory path in the faultless state, which increases the working efficiency of the transmission path.

Furthermore, because the receiving section can be configured using one 2×2 optical space switch and one optical gate, the packaging dimension can be reduced. Since the number of switches is small, even mechanical optical switches, which have effective characteristics and. functions, are applicable with practical packaging size.

Moreover, the transmitting section can be physically divided into optical components through which the working signal passes, and into optical components through which the preparatory signal passes, which presents an advantage of being able to improve the reliability in the system maintenance.

In addition, the transmitting section can be configured with one coupler and one 1×2 optical space switch, which offers an advantage of being able to reduce the packaging dimension. Since the number of switches is small, even mechanical optical switches, which have effective characteristics and functions, are applicable with practical packaging size.

The optical switching system according to the present invention comprises a receiving section including a preparatory receiving optical switch for receiving an optical signal input to a preparatory input port, for spatially switching a path of the input optical signal to two outputs, and for connecting a first output of the two outputs to a preparatory drop port, and a working received optical signal selector for receiving a second output of the preparatory receiving optical switch and an optical signal input to a working input port, and for selecting one of the two inputs to be supplied to a working drop port.

According to the present invention, the receiving section is configured such that it comprises the preparatory receiving optical switch and the working received optical signal selector. If a fault takes place in the working receiving path, the working received optical signal selector carries out switching to select the optical signal from the preparatory receiving path, with breaking the optical signal from the working receiving path. At the same time, the preparatory receiving optical switch stops supplying the optical signal to the preparatory drop port in the fault switching. This enables the communication to make full use of the total transmission capacity of both the working path and the preparatory path in the faultless state, improving the transmission path working efficiency.

Furthermore, in a faultless state, the optical components through which the working signal passes can be physically divided from the optical components through which the preparatory signal passes. This makes it possible for the boards mounting the optical switches to be packaged separately for the working path and preparatory path. Thus, even if a fault takes place in an optical switch element, the recovery job can be achieved in some cases by only replacing the board mounting the working path without removing the connection of the preparatory path, for example. This will improve the reliability of the system.

Moreover, the switch configuration of the receiving section can be implemented using two 1×2 optical space switches, which offers an advantage of being able to reduce the packaging size. Since the number of the switches is small, even mechanical optical switches, which have effective characteristics and functions, are applicable with practical packaging size.

Furthermore, because the transmitting section can be physically divided into optical components through which the working signal passes, and into optical components through which the preparatory signal passes, the reliability in the system maintenance can be improved.

In addition, the switch configuration of the transmitting section can be implemented using one coupler and one 1×2 optical space switch, which offers an advantage of being able to reduce the packaging dimension. Since the number of switches is small, even mechanical optical switches, which have effective characteristics and functions, are applicable with practical packaging size.

The optical switching system according to the present invention comprises a receiving section including a preparatory receiving optical splitter for dividing into two an optical signal input to a preparatory input, and for outputting them, a working received optical signal selector for receiving a first output of the two outputs of the preparatory receiving optical splitter and an optical signal input to a working input port, and for selecting one of the two inputs to be supplied to a working drop port, and a preparatory receiving optical gate for turning on or off a second output of the preparatory receiving optical splitter to be supplied to a preparatory drop port.

According to the present invention, the receiving section is configured such that it comprises the preparatory receiving optical splitter, the working received optical signal selector and the preparatory receiving optical gate. If a fault takes place in the working receiving path, the preparatory receiving optical gate breaks the optical signal sent from the working receiving path to prevent the optical signal from being supplied to the preparatory drop port. This enables the communication to make full use of the total transmission capacity of both the working path and preparatory path in the faultless state, improving the transmission path working efficiency.

Furthermore, in the faultless state, the optical components through which the working signal passes can be physically divided from the optical components through which the preparatory signal passes. This makes it possible, even if a fault takes place in an optical switch element or the like, to carry out a recovery job by only replacing the board mounting the working path without removing the connection of the preparatory path, for example. This will improve the reliability of the system.

Moreover, the switch configuration of the receiving section can be implemented using one coupler, one 1×2 optical space switches and one optical gate, which offers an advantage of being able to reduce the packaging size. Since the number of the switches is small, even mechanical optical switches, which have effective characteristics and functions, are applicable with practical packaging size.

Furthermore, because the transmitting section can be physically divided into optical components through which the working signal passes, and into optical components through which the preparatory signal passes, the reliability in the system maintenance can be improved.

In addition, the switch configuration of the transmitting section can be implemented using one coupler and one 1×2 optical space switch, which offers an advantage of being able to reduce the packaging dimension. Since the number of switches is small, even mechanical optical switches, which have effective characteristics and functions, are applicable with practical packaging size.

The optical switching system according to the present invention comprises a working add/drop switch with two inputs and two outputs for passing through or for switching optical signals input to a working input port and to a working add port, and for supplying the optical signals to a transmitting section and to a receiving section of the optical switching system; and a preparatory add/drop switch with two inputs and two outputs for passing through or switching optical signals input to a preparatory input port and to a preparatory add port, and for supplying the optical signals to the transmitting section and to the receiving section of the optical switching system.

According to the present invention, the optical switching system is configured such that it comprises the working add/drop switch and the preparatory add/drop switch, and these add/drop switches can readily implement the add/drop switching with two 2×2 optical switches. This offers an advantage of being able to construct the optical switching system applicable to a ring network with a small number of unit optical switches, thereby shrinking the packaging dimension.

In addition, because it is possible to make full use of the total transmission capacity of both the working path and preparatory path in the faultless state, the transmission path working efficiency can be improved.

Moreover, applying the optical switching systems can bidirectionally interconnect any desired nodes in a ring network including a plurality of nodes interconnected. This offers an advantage of being able to improve the flexibility of the network.

The optical switching system according to the present invention comprises span switching means provided for each one of sets for switching between a working path and a preparatory path in the same section by switching or by passing through input and output optical signals from and to working input/output ports and from and to preparatory input/output ports; first ring switching means for supplying the span switching means of a first one of the sets with input and output signals associated with a preparatory add port of the first one of the sets, with a working add port of the first one of the sets, with a working drop port of the first one of the sets, and with a preparatory drop port of the first one of the sets by switching or passing through them; and second ring switching means for supplying the span switching means of a second one of the sets with input and output signals associated with a preparatory add port of the second one of the sets, with a working add port of the second one of the sets, with a working drop port of the second one of the sets, and with a preparatory drop port of the second one of the sets by switching or passing through them.

According to the present invention, the optical switching system is configured such that it comprises for each of the two sets the span switching means and the first and second ring switching means. The ring switching means can configure anther preparatory path in a reverse direction even if both the working path and preparatory path fall into a fault at the same time in a particular section of the ring network. The span switching means can detour the signals to the preparatory path in the same section when only the working path falls into a fault and the preparatory path is normal in the section. Providing the two switching modes can improve the reliability of the network.

Furthermore, because both the ring switching means and span switching means are composed of the optical space switches, the number of the optical switches required is small, offering an advantage of being able to reduce the packaging size.

Moreover, because the total transmission capacity of both the working path and preparatory path can be utilized in the faultless state, the working efficiency of the transmission paths can be improved.

BRIEF DESCRIPTION OF THE DRAWINGS

FIGS. 8(1)–(2) are diagrams illustrating connection configurations of a ring network formed using the embodiment 4 of the optical switching system;

DETAILED DESCRIPTION OF THE INVENTION

The embodiments of the invention will now be described.

EMBODIMENT 1

Figure 4:
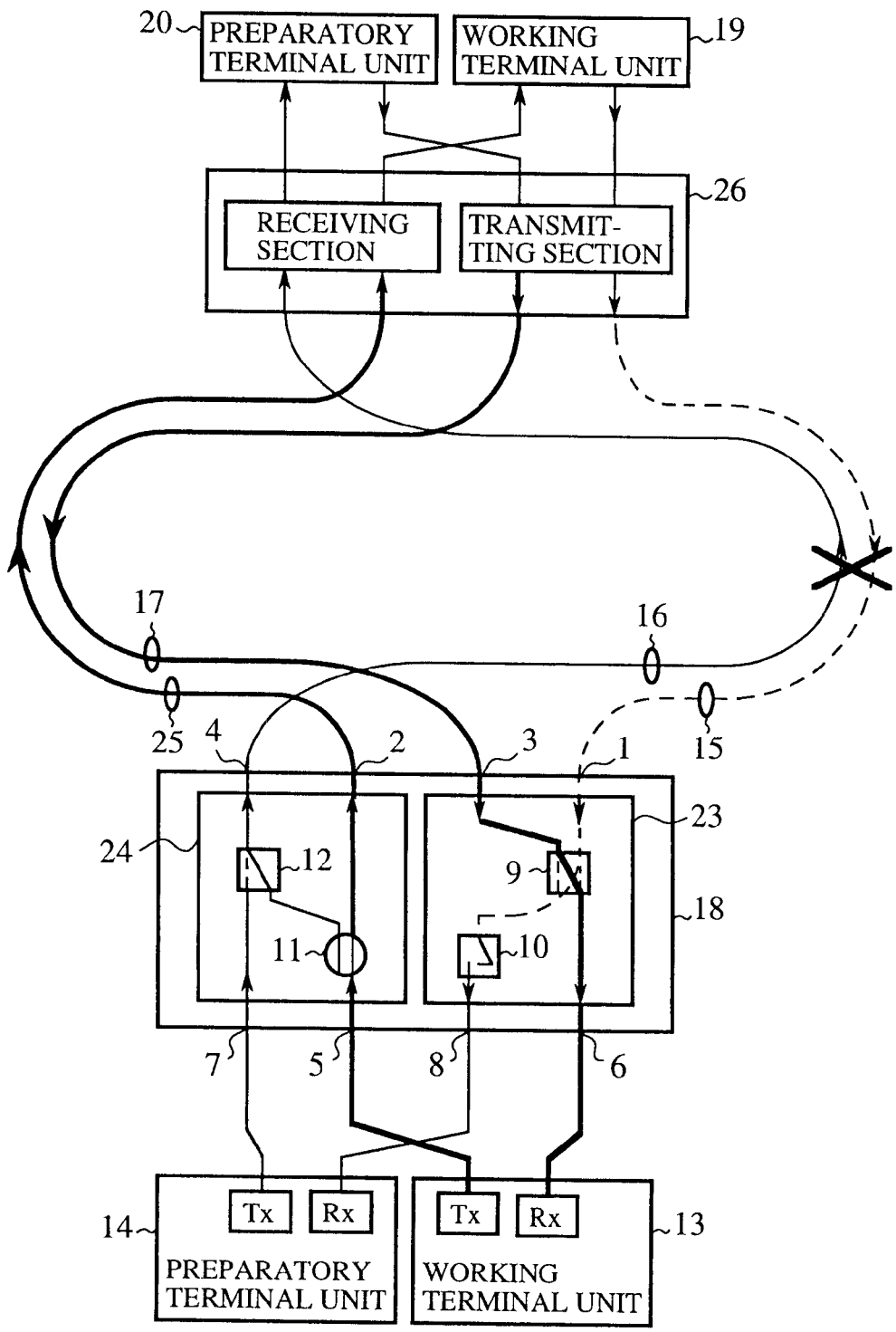
FIG. 4 is a block diagram showing a configuration of an embodiment 1 of an optical switching system in accordance with the present invention.

FIG. 4 is a block diagram showing a configuration of an embodiment 1 of an optical switching system in accordance with the present invention. In this figure, the reference numeral 1 designates an input port of a working system (denoted as "WRKin port" from now on) of the present embodiment 1 of the optical switching system; 2 designates an output port of the working system (denoted as "WRKout port"); 3 designates an input port of a preparatory system (denoted as "PRTin port" for now on); 4 designates an output port of the preparatory system (denoted as "PRTout port" from now on); 5 designates an add port of the working system (denoted as "Add(WRK) port" from now on) for inserting in or transmitting to a transmission path a signal through an optical switching system 18; 6 designates a drop port of the working system (denoted as "Drop(WRK) port" from now on) for discarding or receiving a signal from the transmission path through the optical switching system 18; 7 designates an add port of the preparatory system (denoted as "Add(PRT) port" from now on); and 8 designates a drop port of the preparatory system (denoted as "Drop (PRT) port" from now on).

The reference numerals 18 and 26 each designate the optical switching system of the present embodiment 1; 24 designates a transmitting section that transfers in faultless state the input optical signal to the Add(WRK) port 5 to the WRKout port 2, and the input optical signal to the Add(PRT) port 7 to the PRTout port 4, and that transfers, if a fault takes place on a transmitting side working path which is supplied with the optical signal from the WRKout port 2, the input optical signal to the Add(WRK) port 5 to both the WRKout port 2 and PRTout port 4; 23 designates a receiving section that supplies in the faultless state the input optical signal to the WRKin port 1 to the Drop (WRK) port 6, and the input optical signal to the PRTin port 3 to the Drop(PRT) port 8, and that supplies, if a fault takes place on a receiving side working path transmitting the optical signal to the WRKin port 1, the input signal to the PRTin port 3 to the Drop (WRK) port 6.

The reference numeral 9 designates a receiving optical switch for spatially switching the paths of the optical signals input through the WRKin port 1 and PRTin port 3, thereby outputting one of them to the Drop(WRK) port 6; 10 designates a preparatory receiving optical gate interposed between the remaining output of the receiving optical switch 9 and the Drop(PRT) port 8 for switching between the optical transmissive state and untransmissive state. The receiving optical switch 9 and preparatory receiving optical gate 10 are installed in the receiving section 23.

The reference numeral 11 designates a transmitted optical signal splitter of the working system for dividing the optical signal input to the Add(WRK) port 5 into two, and for supplying one of them to the WRKout port 2; and 12 designates a preparatory transmitted optical signal selector for selecting one of the other output of the working transmitted optical signal splitter 11 and the optical signal input through the Add(PRT) port 7, and supplies the selected signal to the PRTout port 4. The working transmitted optical signal splitter 11 and preparatory transmitted optical signal selector 12 are both installed in the transmitting section 24.

The reference numerals 13 and 19 each designate a working terminal unit for carrying out communications through the working paths when the transmission paths are normal; 14 and 20 each designate a preparatory terminal unit for carrying out the communications through the preparatory paths in the similar manner; the reference numeral 15 designates a working receiving path for connecting the WRKin port 1 of the optical switching system 18 with the WRKout port of the optical switching system 26; 16 designates a preparatory transmitting path for connecting the PRTout port 4 of the optical switching system 18 with the PRTin port of the optical switching system 26; 17 designates a preparatory receiving path for connecting the PRTin port 3 of the optical switching system 18 with the PRTout port of the optical switching system 26; and 25 designates a working transmitting path for connecting the WRKout port 2 of the optical switching system 18 with the WRKin port of the optical switching system 26.

Next, the operation will be described.

In the present embodiment 1, two opposite optical switching systems 18 and 26 are interconnected through the working transmitting path 25 and working receiving path 15, and through the preparatory transmitting path 16 and preparatory receiving path 17. The optical switching systems 18 and 26 are connected with the working terminal units 13 and 19, and with the preparatory terminal units 14 and 20, respectively.

In the normal mode, the optical signal output from the working terminal unit 13 is supplied to the optical switching system 18 through the Add(WRK) port 5, and is transferred to the working terminal unit 19 through the working transmitted optical signal splitter 11, WRKout port 2, working transmitting path 25 and optical switching system 26. In contrast, the working optical signal output from the working terminal unit 19 is supplied to the receiving optical switch 9 of the optical switching system 18 through the optical switching system 26, working receiving path 15 and WRKin port 1. The receiving optical switch 9, which is provided for switching the receiving path by bringing its internal optical transmission paths into a cross state if a fault takes place on the working receiving path 15, is in a through state in a faultless state so that the signal from the WRKin port 1 is transferred to the working terminal unit 13 through the Drop (WRK) port 6, thus establishing the bidirectional communication path between the working terminal units 13 and 19.

On the other hand, it is possible in a faultless state to establish communication path between the preparatory terminal units 14 and.20 using the preparatory transmitting path 16 and preparatory receiving path 17. The optical signal supplied from the preparatory terminal unit 14 to the optical switching system 18 is transferred to the preparatory terminal unit 20 through the preparatory transmitted optical signal selector 12 which is set in a through state, PRTout port 4, preparatory transmitting path 16 and optical switching system 26. On the other hand, the optical signal output from the preparatory terminal unit 20 is supplied to the PRTin port 3 through the optical switching system 26 and preparatory receiving path 17, and is connected to the preparatory receiving optical gate 10 through the receiving optical switch 9 in the through state, arriving at the preparatory terminal unit 14 through the preparatory receiving optical gate 10 in the transmissive state, thereby establishing the bidirectional communication path between the preparatory terminal units 14 and 20. Because the preparatory terminal units 14 and 20 can exchange signals different from those between the working terminal units 13 and 19, the total transmission capacity-of both the working transmitting path 25 and receiving path 15 and of both the preparatory transmitting path 16 and receiving path 17 can be utilized in a faultless state.

If some fault takes place on a working transmission path, the communication is saved by switching the optical switching systems 18 and 26 to detour the working path communications to the preparatory path side.

First, a case will be considered in which a fault takes place on the working receiving path 15 connected to the WRKin port 1.

On the opposite working terminal unit 19 side, the optical switching system 26 divides the transmitted optical signal into two, and supplies them to both the working receiving path 15 and preparatory receiving path 17. In this case, the transmitted signal from the preparatory terminal unit 20 is discarded. The receiving section 23 in the optical switching system 18, detecting the faulty state of the signal from the working receiving path 15, places the receiving optical switch 9 in the cross state in order to connect the signal from the preparatory receiving path 17 to the working terminal unit 13, thus recovering the fault.

The switching of the receiving optical switch 9 entails the path switching of the optical signal fed through the working receiving path 15 to the preparatory receiving optical gate 10 in the untransmissive state so that the optical signal is discarded by the gate function of the preparatory receiving optical gate 10. This can prevent the preparatory terminal unit 14, which receives the optical signal from the preparatory terminal unit 20 in a faultless state, from receiving the optical signal sent from the working terminal unit 19 during the recovery of the fault of the working receiving path 15. In particular, the gate function is essential to avoid erroneous connection in the case where the communication between the working terminal units 13 and 19 differ from that between the preparatory terminal units 14 and 20 in the faultless state.

Next, a case will be considered in which a fault takes place on the working transmitting path 25 connected to the WRKout port 2. The transmitting section 24 in the optical switching system 18 places in a faultless state the preparatory transmitted optical signal selector 12 at the through state, thereby transferring the transmitted signal from the preparatory terminal unit 14 to the preparatory transmitting path 16 through the Add(PRT) port 7 and PRTout port 4. However, if a fault takes place on the working transmitting path 25, the transmission signal from the preparatory terminal unit 14 is discarded to save the communication of the working terminal unit 13. To achieve this, the preparatory transmitted optical signal selector 12 is brought in the cross state so that the transmitted signal from the working terminal unit 13 is divided by the working transmitted optical signal splitter 11 and delivered to both the WRKout port 2 and PRTout port 4 (bridging operation). The optical signal transmitted through the two paths, the working transmitting path 25 and the preparatory transmitting path 16, is received by the optical switching system 26 which selects the optical signal via the preparatory transmitting path 16 and connects it to the working terminal unit 19, thus recovering the communication between the working terminal units 13 and 19 suffering from the fault of the working transmitting path 25.

As described above, the present embodiment 1 can make full use of the total transmission capacity of both the working transmitting path 25 and working receiving path 15 and of both the preparatory transmitting path 16 and preparatory receiving path 17 in the faultless state. In addition, even if a fault takes place on the working transmitting path 25 or working receiving path 15 conveying the currently working signals, the communications of the preparatory system flowing through the preparatory transmitting path 16 and preparatory receiving path 17 are discarded, and the communications of the working system are detoured to the preparatory transmitting path 16 and preparatory receiving path 17. This offers an advantage of being able to save the communications of the working system.

In addition, the number of the optical space switches the embodiment 1 requires is small because the transmitting section 24 requires one 1×2 optical space switch (preparatory transmitted optical signal selector 12), the receiving section 23 requires one 2×2 optical space switch (receiving optical switch 9) and one optical gate switch (preparatory receiving optical gate 10). This offers an advantage of being able to reduce the packaging size.

EMBODIMENT 2

Figure 5:
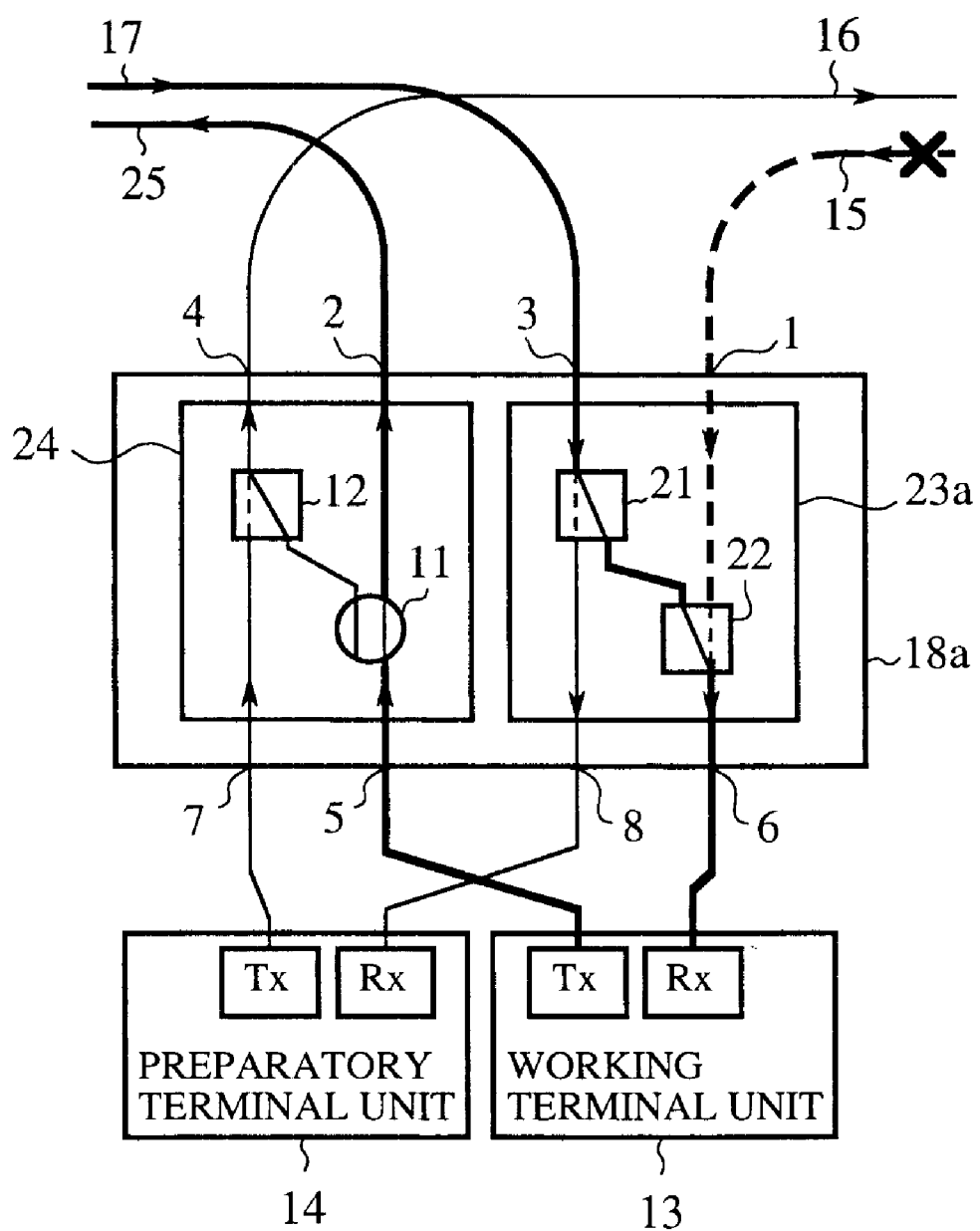
FIG. 5 is a block diagram showing a configuration of an embodiment 2 of the optical switching system in accordance with the present invention.

FIG. 5 is a block diagram showing a configuration of an embodiment 2 of the optical switching system in accordance with the present invention. Incidentally, in the drawings accompanying the following embodiments, the same components as those of the previous embodiments are designated by the same reference numerals, and the description thereof will be omitted.

In FIG. 5, the reference numeral 21 designates a preparatory receiving optical switch for carrying out spatial path switching of the optical signal input from the PRTin port 3, and for supplying a first optical output to the Drop(PRT) port 8; and 22 designates a working received optical signal selector for selecting one of a second optical output of the preparatory receiving optical switch 21 and the optical signal supplied from the WRKin port 1, and for supplying the selected signal to the Drop(WRK) port 6. The reference numeral 23a designates a receiving section including the preparatory receiving optical switch 21 and the working received optical signal selector 22; and 18a designates an optical switching system of the present embodiment 2 comprising the transmitting section 24, receiving section 23a, WRKin port 1, WRKout port 2, PRTin port 3, PRTout port 4, Add(WRK) port 5, Drop(WRK) port 6, Add(PRT) port 7 and Drop(PRT) port 8.

Next, the operation will be described.

The optical switching system 18a of the present embodiment 2 is identical to the optical switching system of the embodiment 1 in that it can utilize in a faultless state the total transmission capacity of both the working transmitting path 25 and working receiving path 15 and of both the preparatory transmitting path 16 and preparatory receiving path 17, and in that it has the switching function inclusive of the function of breaking the optical signal in a fault switching to prevent the preparatory terminal unit 14 from being erroneously connected. Thus, the present embodiment differs from the embodiment 1 only in the configuration of the receiving section 23a.

The receiving section 23a comprises two 2×1 optical space switches (the preparatory receiving optical switch 21 and working received optical signal selector 22). First, in a faultless state, both the preparatory receiving optical switch 21 and working received optical signal selector 22 are in the through connection state, establishing the connection between the WRKin port 1 and Drop(WRK) port 6, and the connection between the PRTin port 3 and Drop(PRT) port 8.

A fault taking place on the working receiving path 15 will bring both the preparatory receiving optical switch 21 and working received optical signal selector 22 into the cross connection state, connecting the PRTin port 3 with the Drop (WRK) port 6. Thus, the working received optical signal selector 22 does not output the optical signal supplied from the WRKin port 1, and the Drop(PRT) port 8 connected to the preparatory terminal unit 14 does not output any optical signal. This can prevent the signal sent from the working terminal unit 19 from being connected to the preparatory terminal unit 14 when the fault takes place on the working receiving path 15, thereby preventing the erroneous connection.

As described above, the present embodiment 2 can make full use of the total transmission capacity of both the working transmitting path 25 and working receiving path 15 and of both the preparatory transmitting path 16 and preparatory receiving path 17 in the faultless state. In addition, if a fault takes place on a working path conveying the currently working signals, the communications of the preparatory system flowing through the preparatory transmitting path 16 and preparatory receiving path 17 are discarded, and the communications of the working system are detoured to the preparatory transmitting path 16 or to the preparatory receiving path 17. This offers an advantage of being able to save the communications of the working system.

In addition, the number of the optical space switches required is small because the transmitting section requires one 1×2 optical space switch (the preparatory transmitted optical signal selector 12), and the receiving section requires two 1×2 optical space switches (the preparatory receiving optical switch 21 and working received optical signal selector 22). This offers an advantage of being able to reduce the packaging size.

Furthermore, considering the optical components in the optical switching system 18a, through which the optical signals pass which are input or output through the ports, it is found that each optical component transmits only one optical signal in the faultless state. For example, the working transmitted optical signal splitter 11 transmits only the input signal fed from the Add (WRK) port 5, and the working received optical signal selector 22 transmits only the input signal fed from the WRKin port 1. This enables the signal paths in the faultless state to be mounted on separate boards, which in turn can prevent the services from being interrupted during the maintenance such as replacing the boards. For example, when the preparatory receiving optical switch 21 and the working received optical signal selector 22 are mounted on different boards, and only the preparatory receiving optical switch 21 must be replaced because of a fault, removing the faulty board will leave the working received optical signal selector 22. This offers an advantage of being able to prevent the working receiving path 15 from being disconnected.

EMBODIMENT 3

Figure 6:
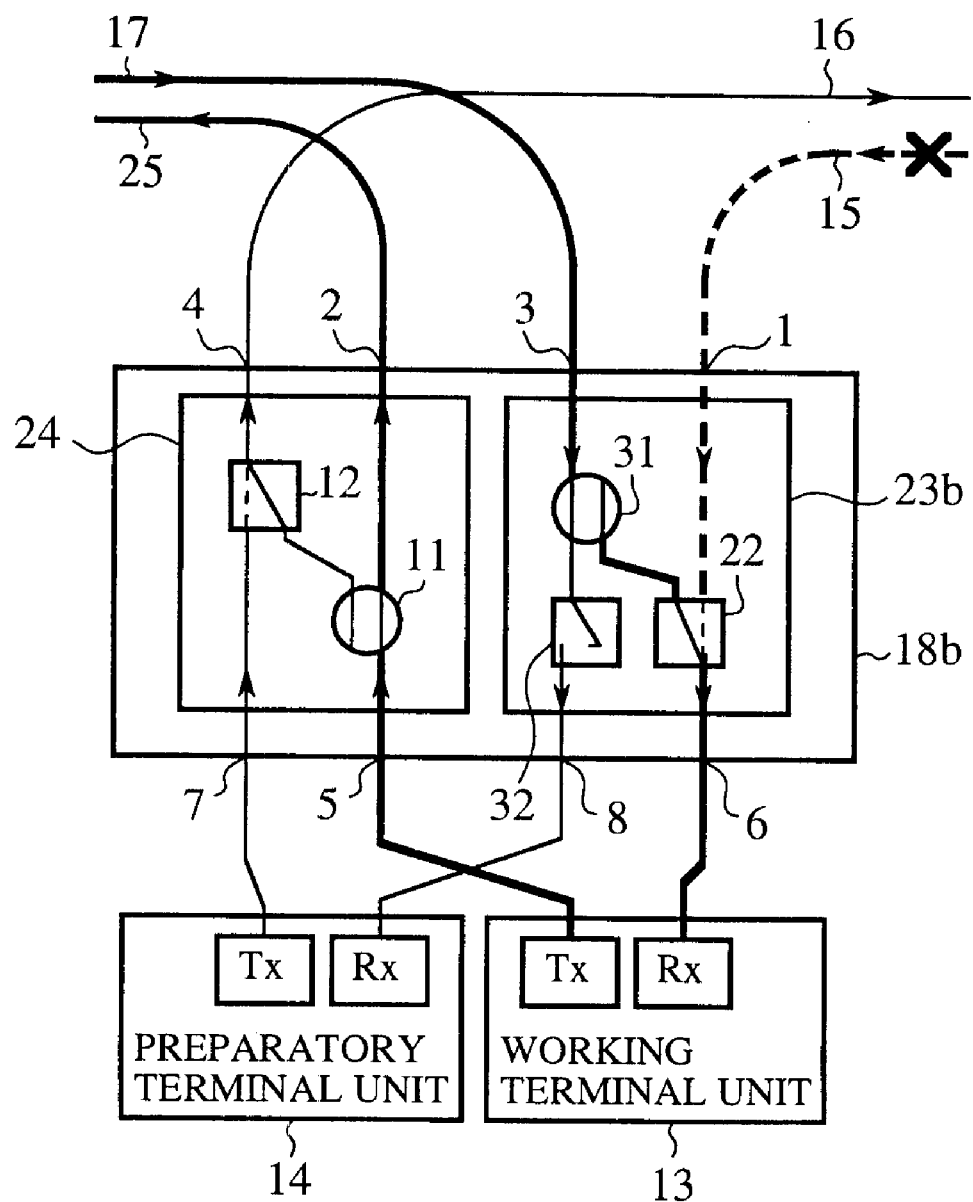
FIG. 6 is a block diagram showing a configuration of an embodiment 3 of the optical switching system in accordance with the present invention.

FIG. 6 is a block diagram showing a configuration of an embodiment 3 of the optical switching system in accordance with the present invention. In this figure, the reference numeral 31 designates a preparatory receiving optical splitter for dividing into two the optical signal supplied from the PRTin port 3; 32 designates a preparatory receiving optical gate installed between a first optical output of the preparatory receiving optical splitter 31 and the Drop(PRT) port 8 for switching between the optical transmissive state and untransmissive state. In the present embodiment 3, the working received optical signal selector 22 is mounted such that it selects one of a second optical output of the preparatory receiving optical splitter 31 and the optical signal supplied from the WRKin port 1, and outputs the selected signal to the Drop(WRK) port 6. The reference numeral 23b designates a receiving section comprising the preparatory receiving optical splitter 31, preparatory receiving optical gate 32 and working received optical signal selector 22; and 18b designates an optical switching system of the present embodiment 3 comprising the transmitting section 24, receiving section 23b, WRKin port 1, WRKout port 2, PRTin port 3, PRTout port 4, Add (WRK) port 5, Drop (WRK) port 6, Add(PRT) port 7 and Drop(PRT) port 8.

Next, the operation will be described.

The optical switching system 18b of the present embodiment 3 is identical to the optical switching systems of the embodiments 1 and 2 in that it can utilize in the faultless state the total transmission capacity of both the working transmitting path 25 and working receiving path 15 and of both the preparatory transmitting path 16 and preparatory receiving path 17, and in that it has the switching function inclusive of the function of breaking the optical signal in a fault switching to prevent the preparatory terminal unit 14 from being erroneously connected. Thus, the present embodiment differs from the embodiments 1 and 2 only in the configuration of the receiving section 23b.

The optical signal supplied from the preparatory receiving path 17 to the PRTin port 3 is divided by the preparatory receiving optical splitter 31. The working received optical signal selector 22 selects one of the optical signals fed from the WRKin port 1 and PRTin port 3, and outputs the selected signal to the Drop(WRK) port 6. Thus, the working terminal unit 13 can receive the optical signal either from the working receiving path 15 or from the preparatory receiving path 17. In addition, the Drop(PRT) port 8 can either be connected to the optical signal input to the PRTin port 3, or be disconnected from the optical signal by closing the preparatory receiving optical gate 32. This enables the signal sent from the working terminal unit 19 through the preparatory receiving path 17 to be connected to the preparatory terminal unit 14 in the faultless state, and to be interrupted in case of a fault of the working receiving path 15, thereby preventing the optical signal from being erroneously connected to the preparatory terminal unit 14.

As described above, the present embodiment 3 can make full use of the total transmission capacity of both the working transmitting path 25 and working receiving path 15 and of both the preparatory transmitting path 16 and preparatory receiving path 17 in the faultless state. In addition, if a fault takes place on one of the working paths conveying the currently working signals, the communications of the preparatory system flowing through the preparatory transmitting path 16 or preparatory receiving path 17 are discarded, and the communications of the working system are detoured to the preparatory transmitting path 16 or to the preparatory receiving path 17. This offers an advantage of being able to save the communications of the working system.

In addition, the number of the optical space switches required is small because the transmitting section 24 requires one 1×2 optical space switch (the preparatory transmitted optical signal selector 12), and the receiving section requires one 1×2 optical space switch (the working received optical signal selector 22) and one optical gate switch (the preparatory receiving optical gate 32). This offers an advantage of being able to reduce the packaging size.

Furthermore, considering the optical components in the optical switching system 18b, through which the optical signals pass which are input or output through the ports, it is found that each optical component transmits only one optical signal in the faultless state. This enables the signal paths in the faultless state to be mounted on separate boards, which can prevent the services from being interrupted during the maintenance such as replacing the boards.

EMBODIMENT 4

Figure 7:
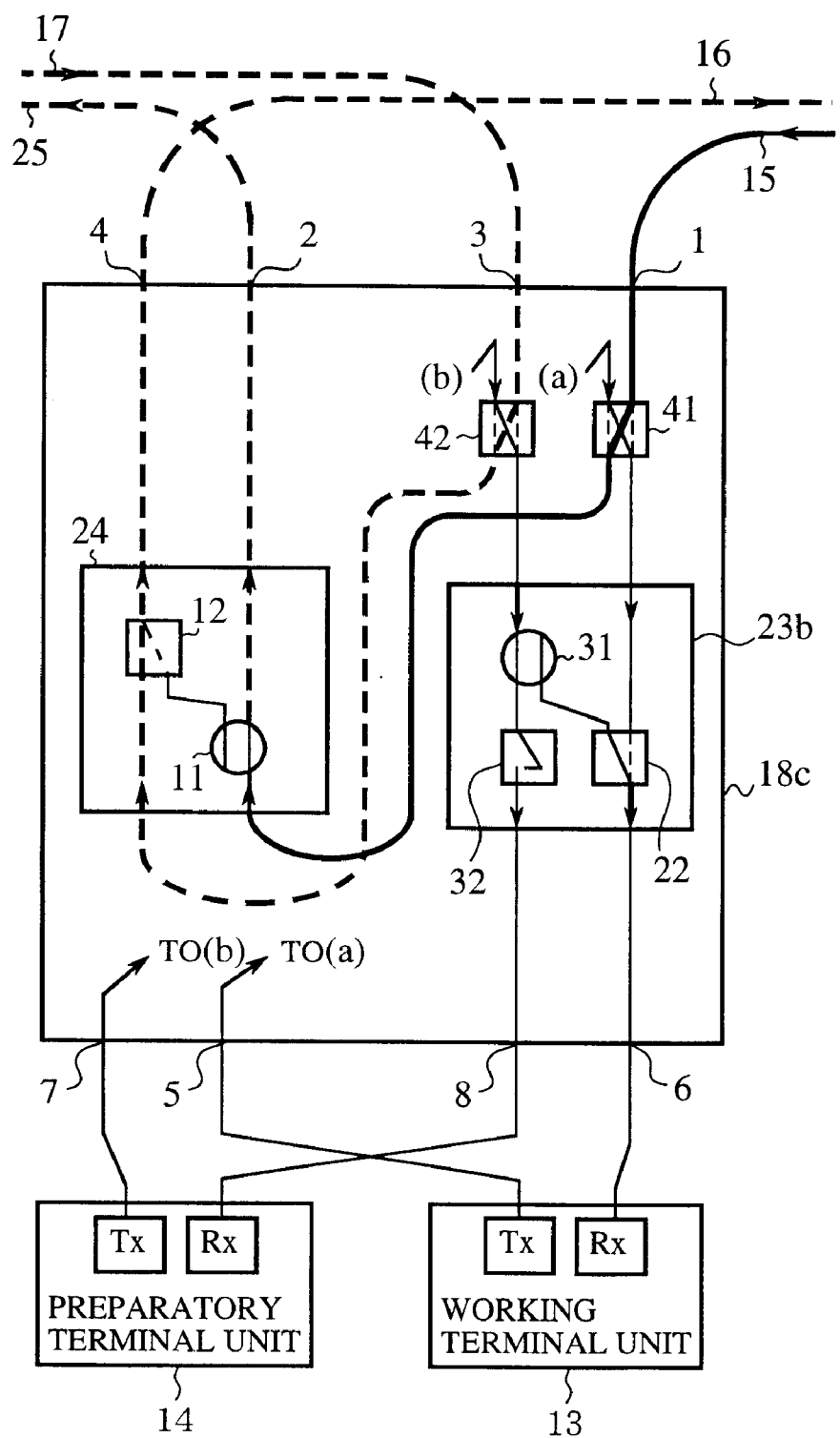
FIG. 7 is a block diagram showing a configuration of an embodiment 4 of the optical switching system in accordance with the present invention.

FIG. 7 is a block diagram showing a configuration of the embodiment 4 of the optical switching system in accordance with the present invention. In this figure, the reference numeral 41 designates a 2×2 working Add/Drop switch that has its two inputs connected to the WRKin port 1 and the Add (WRK) port 5, respectively, and its two outputs connected to the working received optical signal. selector 22 and the working transmitted optical signal splitter 11, respectively, and that switches the connections between the two inputs and the two outputs with taking the two sates, the through state and the cross state. The reference numeral 42 designates a 2×2 preparatory Add/Drop switch that has its two inputs connected to the PRTin port 3 and the Add(PRT)

port 7, respectively, and its two outputs connected to the preparatory receiving optical splitter 31 and the preparatory transmitted optical signal selector 12, respectively, and that switches the connections between the two inputs and the two outputs with taking the two sates, the through state and the cross state.

Next, the operation will be described.

Figure 1:
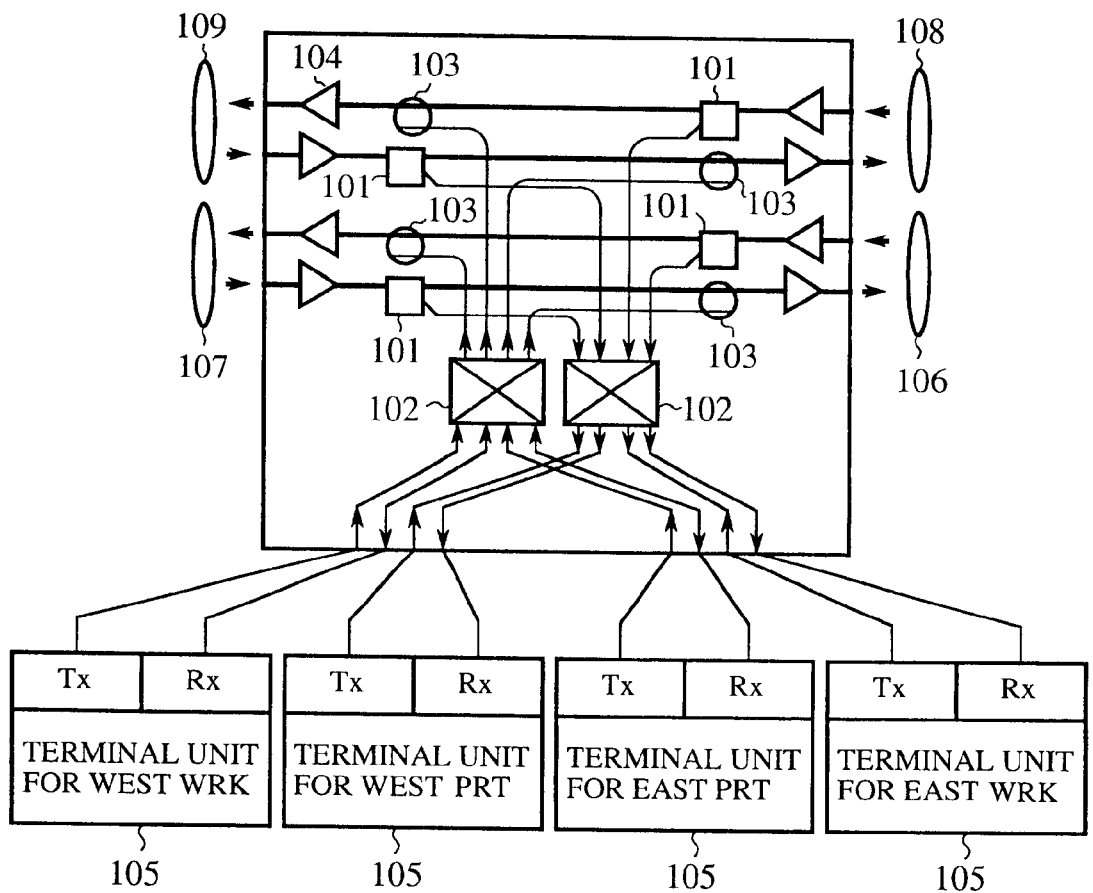
FIG. 1 is a block diagram showing a configuration of a conventional optical switching system.
Figure 2:
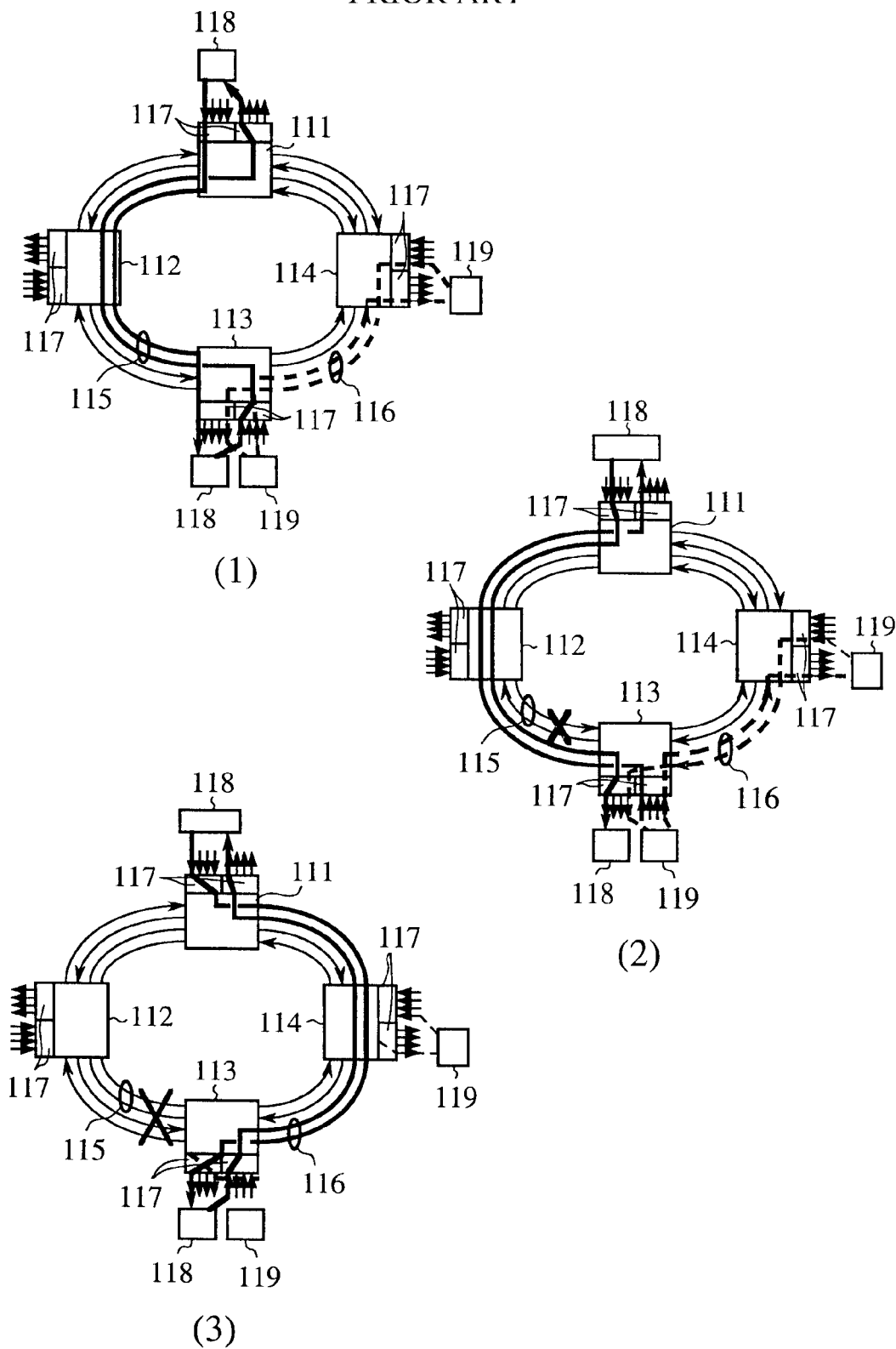
FIGS. 2(1)–(3) are operational diagrams illustrating path switching operations in case of a fault in the conventional optical switching system.
Figure 3:
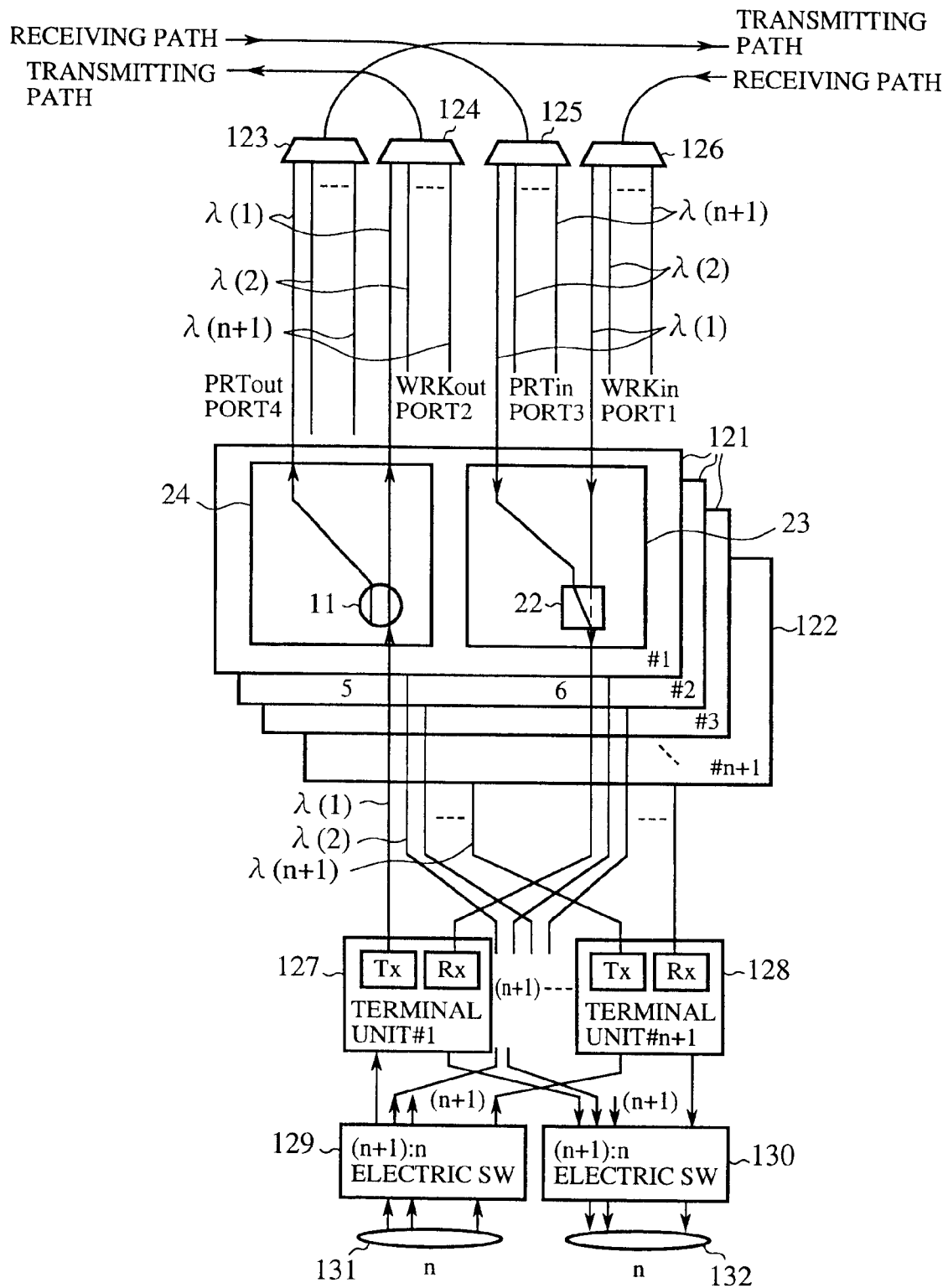
FIG. 3 is a block diagram showing a configuration of another conventional optical switching system.

Although the description of the foregoing embodiments 1, 2 and 3 is made about the transmission path switching between the two opposite optical switching systems, the conventional Add/Drop ring network as shown in FIGS. 1 and 2 interconnects two or more systems in a ring configuration, and establishes the communication path between any two optical switching systems that perform the Add/Drop operation. This is carried out by inserting or transmitting the optical signal into or to the transmission path of the network (this operation will be denoted as "Add" from now on), or by placing the system at the path through state in which the signal from the transmission path is not remove or receive (Drop), but is passed through the system without change. The object of the present embodiment 4 is to apply its system to such an Add/Drop ring network. It interconnects the WRKin port 1 with the WRKout port 2, and the PRTin port 3 with the PRTout port 4 in order to implement the path through state in which no connections are established between the WRKin port 1 and Drop(WRK) port 6, between the Add(WRK) port 5 and WRKout port 2, between the PRTin port 3 and Drop(PRT) port 8, and between the Add(PRT) port 7 and PRTout port 4.

FIG. 8 shows an example of a connection configuration of a ring network. In this figure, reference numerals 51–54 each designate a working terminal unit; 55 designates a bidirectional working path constituting a working transmitting/receiving path; and 56 designates a bidirectional preparatory path constituting a preparatory transmitting/receiving path. In the connection configuration the Add/Drop ring network comprises four optical switching systems 18c. A bidirectional communication is carried out between the working terminal unit 51 and working terminal unit 52 through the working path 55, for example.

The optical switching systems 18c installing the working terminal units 51 and 52 involved in the communication are in the Add/Drop state in which the signals are transmitted to or received from the working path 55. The remaining optical switching systems 18c connected with the working terminal units 53 and 54 not involved in the communication are in the path through state in which the sections of the working path are interconnected, and the sections of the preparatory path 56 are interconnected without establishing the Add/Drop connection.

If a fault takes place on the working path 55 interconnecting the working terminal unit 51 and working terminal unit 52, the two optical switching systems 18c in the Add/Drop state undergo fault switching so that the communication path is switched to the preparatory path 56 side to save the communication. In this case, the optical switching systems 18c connected with the working terminal units 53 and 54 not involved in the communication keep the path through state.

The switching to place the optical switching system 18c in the path through state or in the Add/Drop state is carried out by the working Add/Drop switch 41 and preparatory Add/Drop switch 42 as shown in FIG. 7. When the working Add/Drop switch 41 and preparatory Add/Drop switch 42 are in the cross state, the optical signals input to the WRKin port 1 and PRTin port 3 pass through the Add/Drop switches 41 and 42, respectively, and are supplied to the transmitting section 24. When the preparatory transmitted optical signal selector 12 is in the through state, the input signals are transferred to the WRKout port 2 and PRTout port 4, thereby establishing the connections between the WRKin port 1 and WRKout port 2, and between the PRTin port 3 and PRTout port 4. Thus, the optical switching system 18c is placed in the path through state.

To bring the optical switching system 18c in the Add/Drop state, the Add/Drop switches 41 and 42 are brought in the through state. The switching of the working Add/Drop switch 41 can change the state between the Add/Drop state and the path through state of the working signal, and the switching of the preparatory Add/Drop switch 42 can change the state between the Add/Drop state and path through state of the preparatory signal.

Figure 9:
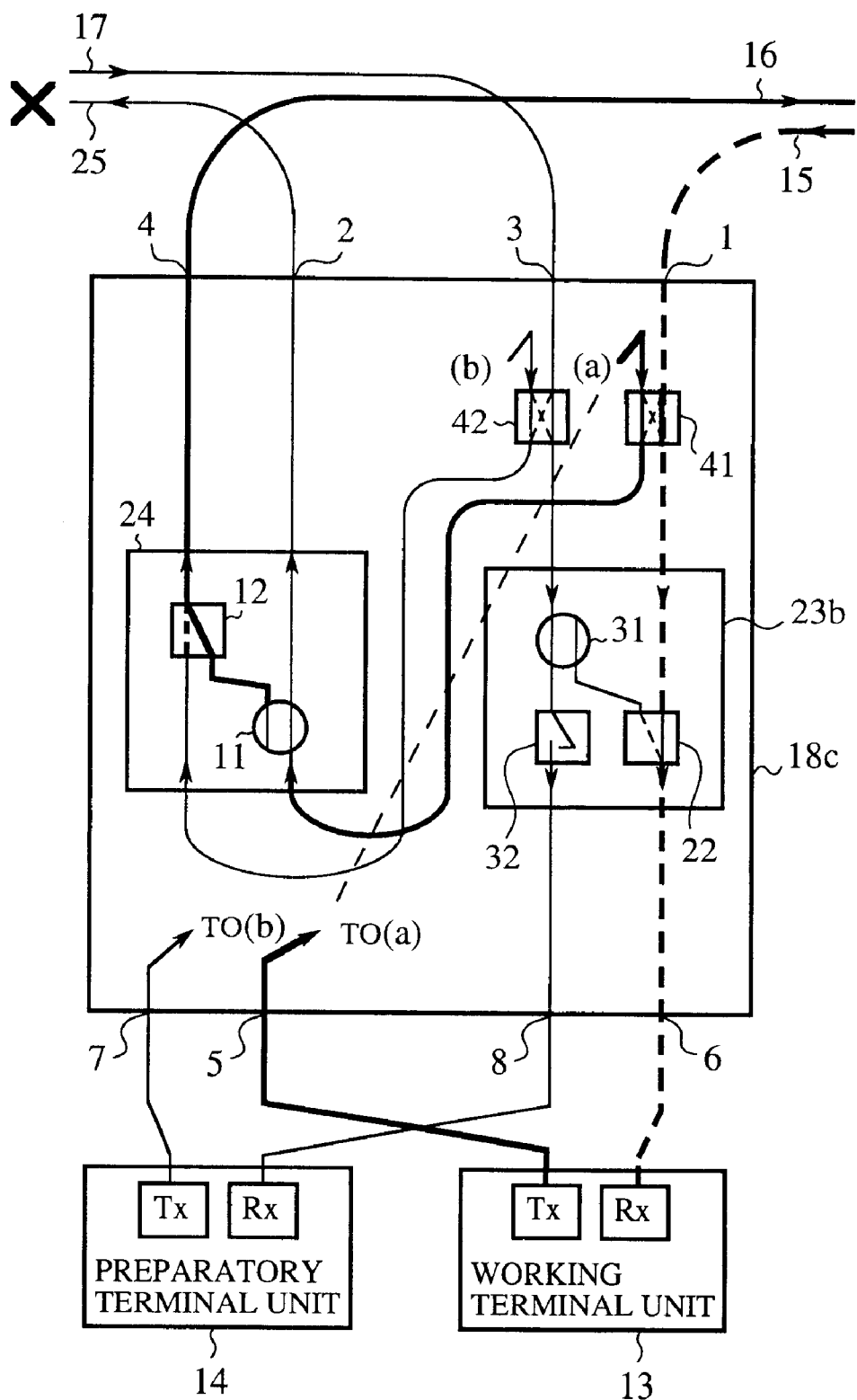
FIG. 9 is a block diagram showing a switching pattern in case of a fault taking place on a working transmitting path of the ring network formed by using the embodiment 4 of the optical switching system.
Figure 10:
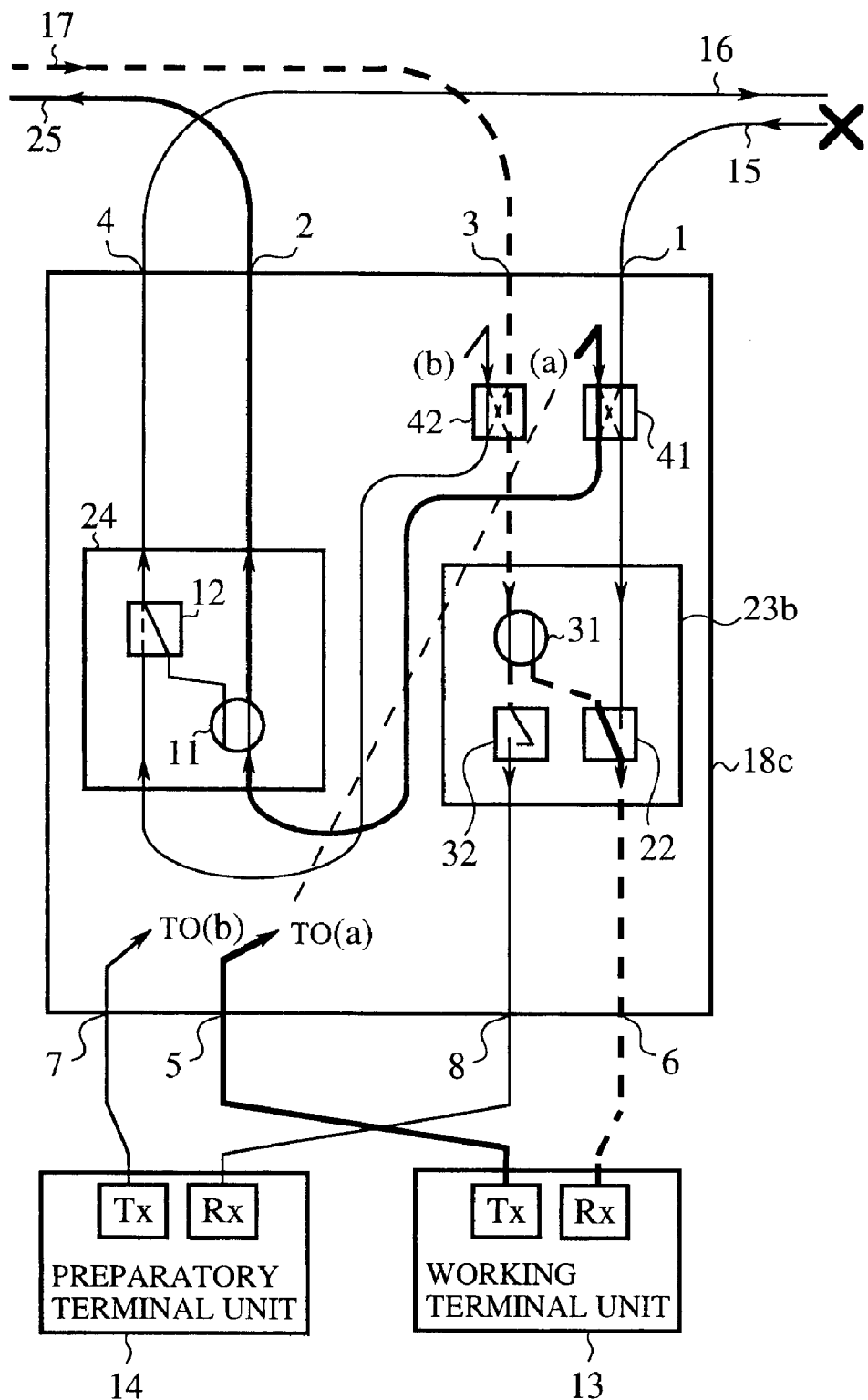
FIG. 10 is a block diagram showing a switching pattern in case of a fault taking place on a working receiving path of the ring network formed by using the embodiment 4 of the optical switching system.

If a fault takes place in such a ring network, the switching pattern must be changed in accordance with the fault position. FIG. 9 illustrates a switching pattern when a fault takes place on the working transmitting path 25, whereas FIG. 10 illustrates a switching pattern when a fault takes place on the working receiving path 15. In either case, switching of the preparatory transmitted optical signal selector 12 and/or of the working received optical signal selector 22 can implement the operation of the different switching patterns.

More specifically, when a fault takes place on the working transmitting path 25 as illustrated in FIG. 9, the optical signal from the working terminal unit 13 is transmitted through the Add (WRK) port 5, working Add/Drop switch 41, working transmitted optical signal splitter 11, preparatory transmitted optical signal selector 12 and PRTout port 4, and is supplied to the preparatory transmitting path 16. On the other hand, the optical signal is received from the working receiving path 15 by the working terminal unit 13 through the WRKin port 1, working Add/Drop switch 41, working received optical signal selector 22 and Drop (WRK) port 6, or is received from the preparatory receiving path 17 by the preparatory terminal unit 14 through the PRTin port 3, preparatory Add/Drop switch 42, preparatory receiving optical splitter 31, preparatory receiving optical gate 32 and Drop (PRT) port 8.

Likewise, when a fault takes place. on the working receiving path 15 as illustrated in FIG. 10, the optical signal transmitted via the preparatory receiving path 17 is received by the working terminal unit 13 by capturing it from the PRTin port 3, and by conveying it to the working terminal unit 13 through the preparatory Add/Drop switch 42, preparatory receiving optical splitter 31, working received optical signal selector 22 and Drop (WRK) port 6. On the other hand, the optical signal is sent from the working terminal unit 13 to the working transmitting path 25 through the Add(WRK) port 5, working Add/Drop switch 41, working transmitted optical signal splitter 11 and WRKout port 2, or is sent from the preparatory terminal unit 14 to the preparatory transmitting path 16 through the Add(PRT) port 7, preparatory Add/Drop switch 42, preparatory transmitted optical signal selector 12 and PRTout port 4.

Although the present embodiment 4 employs the receiving section 23b of the embodiment 3 as the receiving section, using the receiving section 23 or 23a of the embodiment 1 or 2 can implement the same operation.

As described above, the present embodiment 4 can make full use of the total transmission capacity of both the working transmitting path 25 and working receiving path 15 and of both the preparatory transmitting path 16 and preparatory receiving path 17 in the faultless state. Furthermore, in case of a fault, the communications of the working transmitting path 25 or the working receiving path 15 are detoured to the preparatory transmitting path 16 or preparatory receiving path 17. This offers an advantage of being able to save the communications of the working system.

In addition, although the Add/Drop function is added in the present embodiment 4, the optical switching system 18c can be constructed by adding to the number of the optical space switches required in the embodiments 1–3 the two 2×2 optical space switches (the working Add/Drop switch 41 and preparatory Add/Drop switch 42). This offers an advantage of being able to reduce the number of unit switches as compared with the conventional example 1, thereby shrinking the packaging size.

Furthermore, the working Add/Drop switch 41 and preparatory Add/Drop switch 42 added to carry out the Add/Drop functions in the present embodiment 4 are composed of the separate optical space switches corresponding to the working and preparatory systems each. This enables the two systems to be mounted on separate boards. Accordingly, even if a fault takes place in the Add/Drop switch of one of the systems, and a recovery job involving the board removal is required, it is unnecessary to remove the optical space switch of the other system. This offers an advantage of being able to prevent the services of the faultless system from being interrupted.

EMBODIMENT 5

Figure 11:
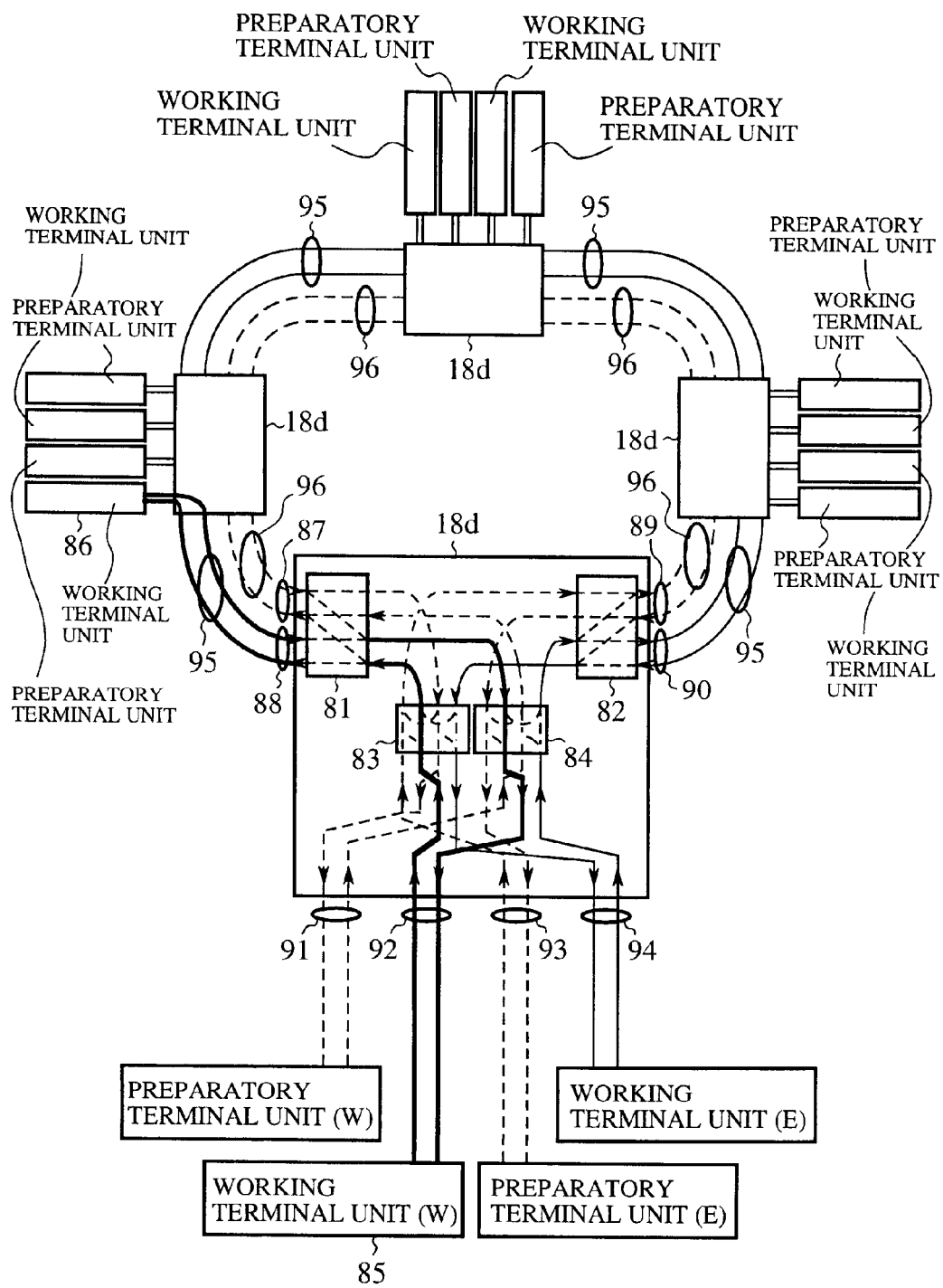
FIG. 11 is a block diagram showing a configuration of an embodiment 5 of the optical switching system in accordance with the present invention.

FIG. 11 is a block diagram showing a configuration of the embodiment 5 of the optical switching system in accordance with the present invention. In this figure, each reference numeral 18d designates an optical switching system of the present embodiment 5; 81 designates a span switching means for switching between a working path and a preparatory path in the same section on a West side transmission path; 82 designates an East side span switching means; 83 and 84 each designate a ring switching means (first and second ring switching means) for switching between the sections themselves on the transmission path; 85 and 86 each designate a working terminal unit; 87 designates a West side PRT in/out port; 88 designates a West side WRK in/out port; 89 designates an East side PRT in/out port; 90 designates an East side WRK in/out port; 91 designates a West side Add/Drop(PRT) port (Add(PRT) port and Drop(PRT) port); 92 designates a West side Add/Drop(WRK) port (Add(WRK) port and Drop(WRK) port); 93 designates an East side Add/Drop(PRT) port (Add(PRT) port and Drop (PRT) port); 94 designates an East side Add/Drop(WRK) port (Add(WRK) port and Drop (WRK) port); 95 designates a working path; and 96 designates a preparatory path.

Next, the operation will be described.

In the present embodiment 5, the working terminal unit 85 connected to the West side Add/Drop(WRK) port 92 of the optical switching system 18d is bidirectionally connected with the working terminal unit 86 via the ring switching means 83, West side span switching means 81 and working path 95.

If a fault takes place on the working path 95 between the optical switching system 18d connected with the working terminal unit 85 and the optical switching system 18d connected with the working terminal unit 86, and if the preparatory path 96 in the same section is normal, the span switching means 81 carries out the span switching through the steps as described in the embodiments 1–4. The span switching can be carried out between the two optical switching systems 18d adjacent to the fault section. Even if a plurality of working path faults take place between the end nodes carrying out the communications, their recovery can be implemented by the span switching in that section. In the conventional example as illustrated in FIG. 2(2), the path switching is carried out by the end nodes when the fault takes place on the transmission path 115 only. In this case, if a fault takes place on the transmission path 115 between the nodes 113 and 112, and another fault takes place on the transmission path 116 between the nodes 112 and 111, a communication path passing through the node 112 cannot be secured. The present embodiment 5 carries out the span switching independently for each path between the adjacent nodes. This offers an advantage of being able to secure the path even in the fault pattern as described above.

Figure 12:
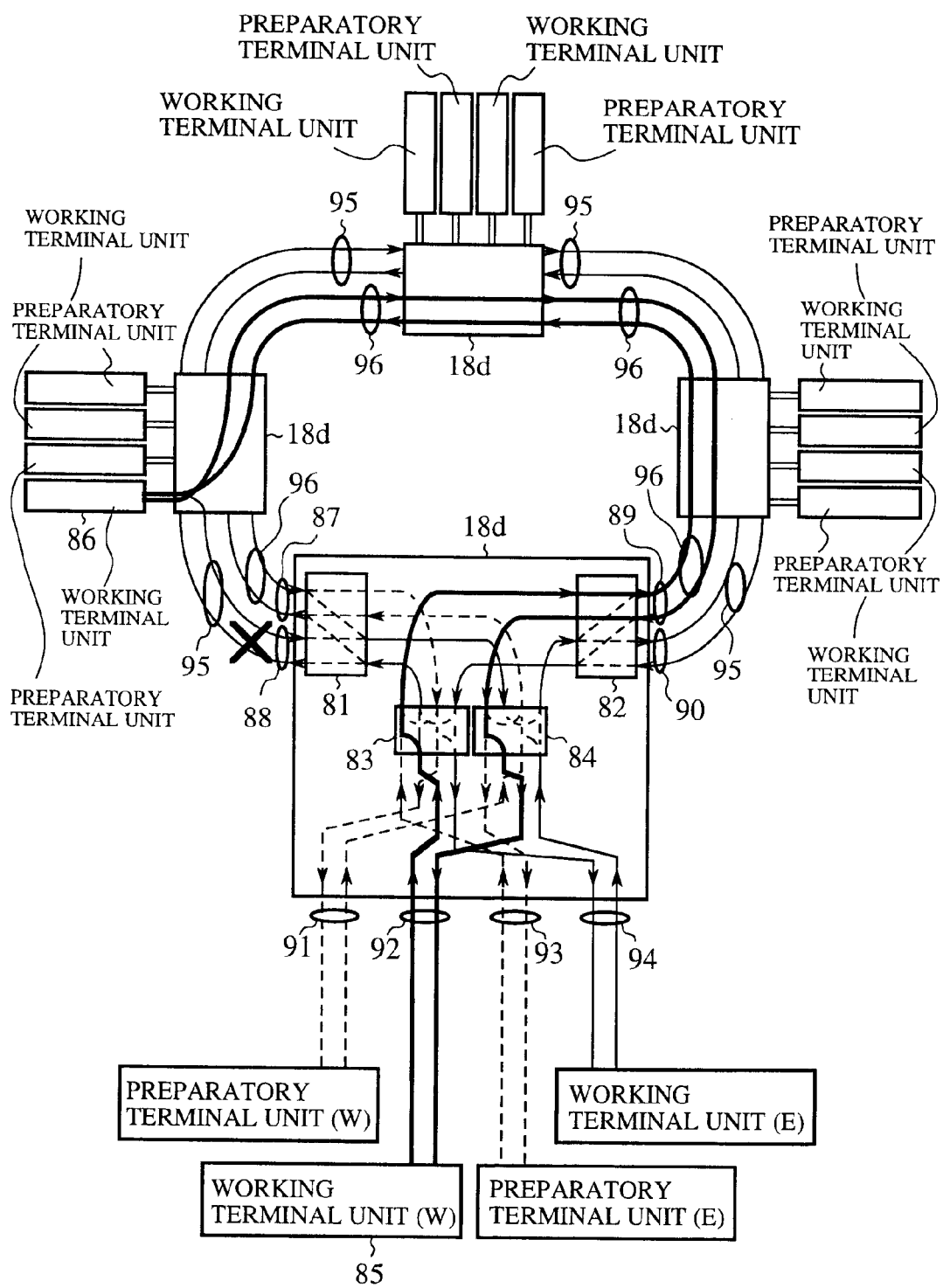
FIG. 12 is a block diagram showing a switching state of a ring on the ring network employing the embodiment 5 of the optical switching system.

FIG. 12 illustrates a switching state of the ring switching. If faults take place at the same time on the working path 95 and preparatory path 96 in the same section, the ring switching means 83 carries out the switching to the reverse direction preparatory path 96 to save the communication. The ring switching function is equivalent to the switching of the conventional example as illustrated in FIG. 2(3).

INDUSTRIAL APPLICABILITY

As described above, the optical switching system according to the present invention comprises in the transmitting section the preparatory transmitted optical signal selector and working transmitted optical signal splitter, each of which can be implemented using a 1×2 optical space switch, and in the receiving section the receiving optical switch implemented using a 2×2 optical space switch, and the preparatory receiving optical gate implemented using a 1×2 optical space switch. This enables the switching between the working and preparatory systems without using a 4×4 optical space switch. Thus, the optical switching system is preferably applied to the path switching of the network interconnecting a plurality of nodes through the working path and preparatory path conveying optical signals.

What is claimed is:

1. An optical switching system including a working output port to be connected to a working transmitting path, a working input port to be connected to a working receiving path, a preparatory output port to be connected to a preparatory transmitting path, a preparatory input port to be connected to a preparatory receiving path, a working add port to be connected to a transmitting section of a working terminal unit, a working drop port to be connected to a receiving section of the working terminal unit, a preparatory add port to be connected to a transmitting section of a preparatory terminal unit, and a preparatory drop port to be connected to a receiving section of the preparatory terminal unit, said optical switching system comprising:

a transmitting section including a working transmitted optical signal splitter for splitting an optical signal input to the working add port and for supplying split optical signals to the working output port and toward the preparatory output port, and a preparatory transmitted optical signal selector for selecting one of a first output of the working transmitted optical signal splitter and an optical signal input to the preparatory add port, and for supplying a selected optical signal to the preparatory output port; and a receiving section including a receiving optical switch for receiving an optical signal input to the working input port and an optical signal input to the preparatory input port, for outputting as two output signals the two input signals by spatially switching their paths or by passing them through, and for connecting a first output of the two output signals to the working drop port, and a preparatory receiving optical gate for turning on or off a second output signal of the receiving optical switch to be supplied to the preparatory drop port.

2. The optical switching system according to claim 1, further comprising:
- a working add/drop switch with two inputs and two outputs for passing through or for switching optical signals input to the working input port and to the working add port, and for supplying the optical signals to the transmitting section and to the receiving section of the optical switching system; and
- a preparatory add/drop switch with two inputs and two outputs for passing through or switching optical signals input to the preparatory input port and to the preparatory add port, and for supplying the optical signals to the transmitting section and to the receiving section of the optical switching system.

3. An optical switching system including a working output port to be connected to a working transmitting path, a working input port to be connected to a working receiving path, a preparatory output port to be connected to a preparatory transmitting path, a preparatory input port to be connected to a preparatory receiving path, a working add port to be connected to a transmitting section of a working terminal unit, a working drop port to be connected to a receiving section of the working terminal unit, a preparatory add port to be connected to a transmitting section of a preparatory terminal unit, and a preparatory drop port to be connected to a receiving section of the preparatory terminal unit, said optical switching system comprising:
- a transmitting section including a working transmitted optical signal splitter for splitting an optical signal input to the working add port and for supplying split optical signals to the working output port and toward the preparatory output port, and a preparatory. transmitted optical signal selector for selecting one of a first output of the working transmitted optical signal splitter and an optical signal input to the preparatory add port, and for supplying a selected optical signal to the preparatory output port; and
- a receiving section including a preparatory receiving optical switch for receiving an optical signal input to the preparatory input port, for spatially switching a path of the input optical signal to two outputs, and for connecting a first output of the two outputs to the preparatory drop port, and a working received optical signal selector for receiving a second output of said preparatory receiving optical switch and an optical signal input to the working input port, and for selecting one of the two inputs to be supplied to the working drop port.

4. The optical switching system according to claim 3, further comprising:
- a working add/drop switch with two inputs and two outputs for passing through or for switching optical signals input to the working input port and to the working add port, and for supplying the optical signals to the transmitting section and to the receiving section of the optical switching system; and
- a preparatory add/drop switch with two inputs and two outputs for passing through or switching optical signals input to the preparatory input port and to the preparatory add port, and for supplying the optical signals to the transmitting section and to the receiving section of the optical switching system.

5. An optical switching system including a working output port to be connected to a working transmitting path, a working input port to be connected to a working receiving path, a preparatory output port to be connected to a preparatory transmitting path, a preparatory input port to be connected to a preparatory receiving path, a working add port to be connected to a transmitting section of a working terminal unit, a working drop port to be connected to a receiving section of the working terminal unit, a preparatory add port to be connected to a transmitting section of a preparatory terminal unit, and a preparatory drop port to be connected to a receiving section of the preparatory terminal unit, said optical switching system comprising:
- a transmitting section including a working transmitted optical signal splitter for splitting an optical signal input to the working add port and for supplying split optical signals to the working output port and toward the preparatory output port, and a preparatory transmitted optical signal selector for selecting one of a first output of the working transmitted optical signal splitter and an optical signal input to the preparatory add port, and for supplying a selected optical signal to the preparatory output port; and
- a receiving section including a preparatory receiving optical splitter for dividing into two an optical signal input to the preparatory input, and for outputting them, a working received optical signal selector for receiving a first output of the two outputs of said preparatory receiving optical splitter and an optical signal input to the working input port, and for selecting one of the two inputs to be supplied to the working drop port, and a preparatory receiving optical gate for turning on or off a second output of said preparatory receiving optical splitter to be supplied to the preparatory drop port.

6. The optical switching system according to claim 5, further comprising:
- a working add/drop switch with two inputs and two outputs for passing through or for switching optical signals input to the working input port and to the working add port, and for supplying the optical signals to the transmitting section and to the receiving section of the optical switching system; and
- a preparatory add/drop switch with two inputs and two outputs for passing through or switching optical signals input to the preparatory input port and to the preparatory add port, and for supplying the optical signals to the transmitting section and to the receiving section of the optical switching system.

7. An optical switching system including two working input/output ports to be connected to a working path, two preparatory input/output ports which are connected to a preparatory path and are paired with the working input/output ports to constitute two sets, a working add port to be connected to a transmitting section of a working terminal unit, a working drop port to be connected to a receiving section of the working terminal unit, a preparatory add port to be connected to a transmitting section of a preparatory terminal unit, and a preparatory drop port to be connected to a receiving section of the preparatory terminal unit, said optical switching system comprising:
- span switching means provided for each one of said sets for switching between said working path and said preparatory path in a same section by switching or by passing through input and output optical signals to and from the working input/output ports and to and from the preparatory input/output ports;
- first ring switching means for supplying said span switching means of a first one of said sets with input and output signals associated with the preparatory add port of the first one of said sets, with the working add port of the first one of said sets, with the working drop port of the first one of said sets, and with the preparatory drop port of the first one of said sets by switching or passing through them; and second ring switching means for supplying said span switching means of a second one of said sets with input and output signals associated with the preparatory add port of the second one of said sets, with the working add port of the second one of said sets, with the working drop port of the second one of said sets, and with the preparatory drop port of the second one of said sets by switching or passing through them.

* * * * *